United States Patent [19]

Rejc

[11] Patent Number: 4,655,019
[45] Date of Patent: Apr. 7, 1987

[54] PANEL-LIKE STRUCTURAL COMPONENT

[75] Inventor: Gabriel Rejc, Moosburg, Fed. Rep. of Germany

[73] Assignee: EFAFLEX Transport-und-Lager-Technik GmbH, Bruckberg-Edlkofen, Fed. Rep. of Germany

[21] Appl. No.: 779,704

[22] Filed: Sep. 24, 1985

[30] Foreign Application Priority Data

Sep. 26, 1984 [DE] Fed. Rep. of Germany ....... 3435300

[51] Int. Cl.$^4$ ................................................ E04B 3/04
[52] U.S. Cl. ...................................... 52/475; 52/204; 52/239; 52/656; 49/501; 403/187
[58] Field of Search ............ 52/204, 207, 239, 36, 52/238.1, 475, 455, 656; 49/501; 403/187, 231, 246

[56] References Cited

U.S. PATENT DOCUMENTS 3,040,847 6/1962 Webster ......................... 52/495 X
3,295,283 2/1967 Griffith et al. ....................... 52/475

FOREIGN PATENT DOCUMENTS 2150236 11/1972 Fed. Rep. of Germany .
2325148 9/1974 Fed. Rep. of Germany ...... 403/187
2804218 8/1979 Fed. Rep. of Germany ........ 49/501
2913281 10/1980 Fed. Rep. of Germany .
1188647 9/1959 France ................................... 52/475
1149277 4/1969 United Kingdom .

Primary Examiner—Carl D. Friedman
Assistant Examiner—Richard Chilcot

[57] ABSTRACT

A panel-like structural component for gates, doors, facings or the like includes a main wall and a frame surrounding the main wall. The frame is composed of sectional members with hollow rectangular cross sections whose inner walls facing the inside of the frame have at least one groove at least in the longitudinal direction of the matter. The grooves of all longitudinal members open into each other and form a continuous peripheral groove into which a panel forming the main wall is inserted at its edges. The grooves are also used to join two sectional members together: the groove, which becomes wider toward its interior, is engaged at one of the sectional members with a projection formed on a connecting piece fastened to the other sectional member. The connecting piece is made up of a segment of another sectional member. The structural component can be produced with little labor and material; it is stable and lightweight and can be disassembled to simplify repair in the event it is damaged.

12 Claims, 11 Drawing Figures

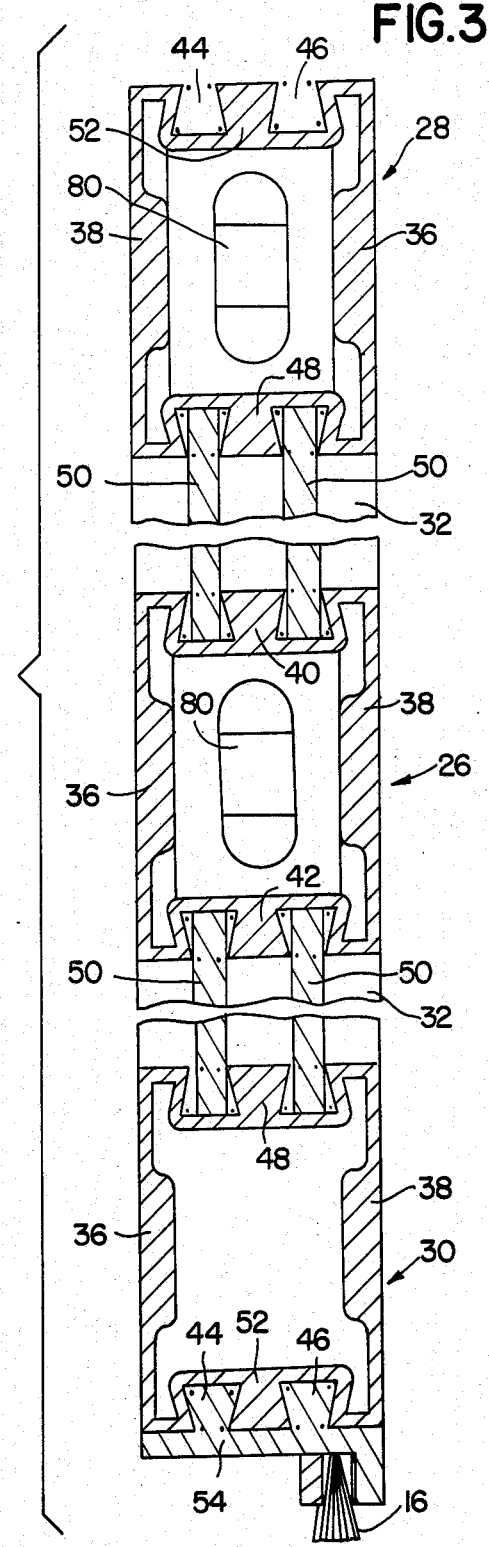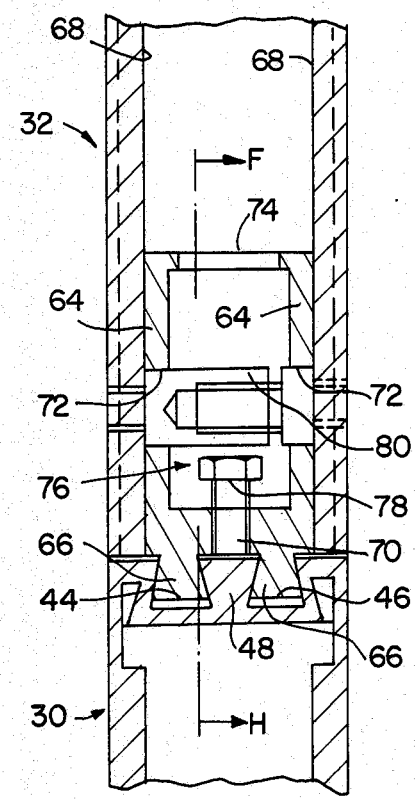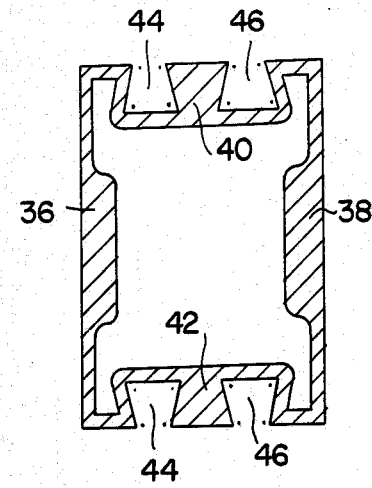

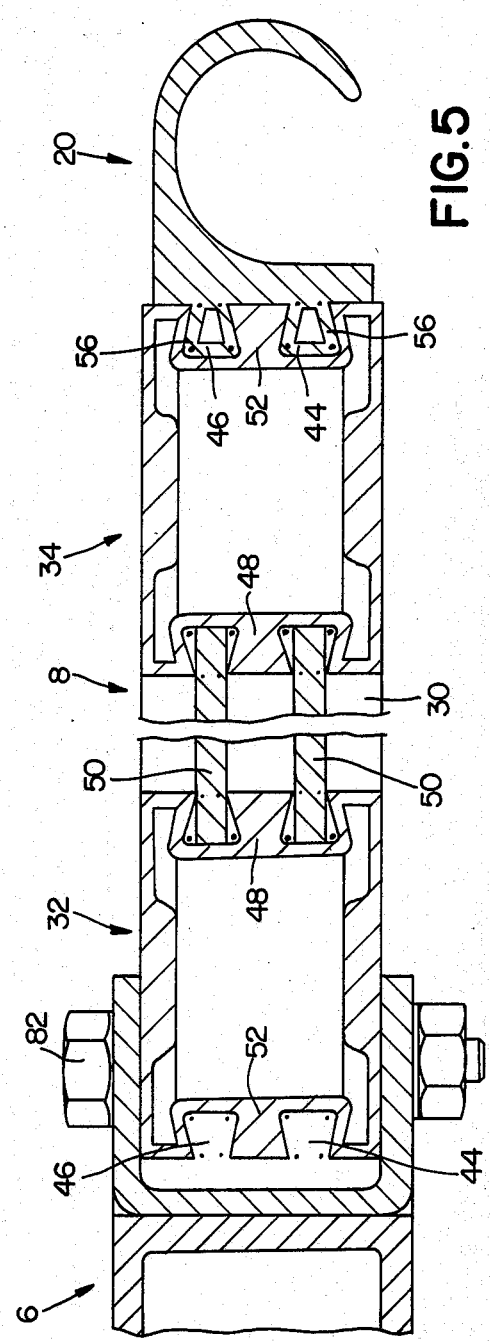
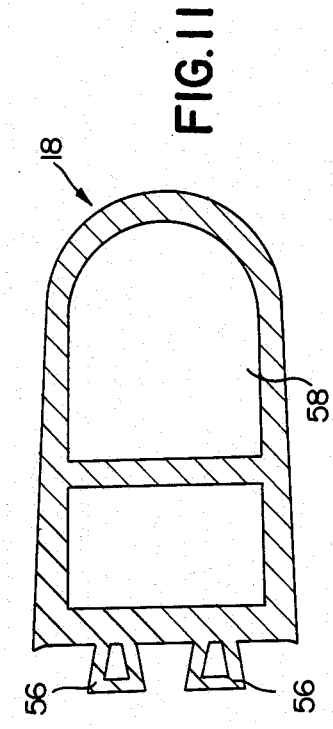

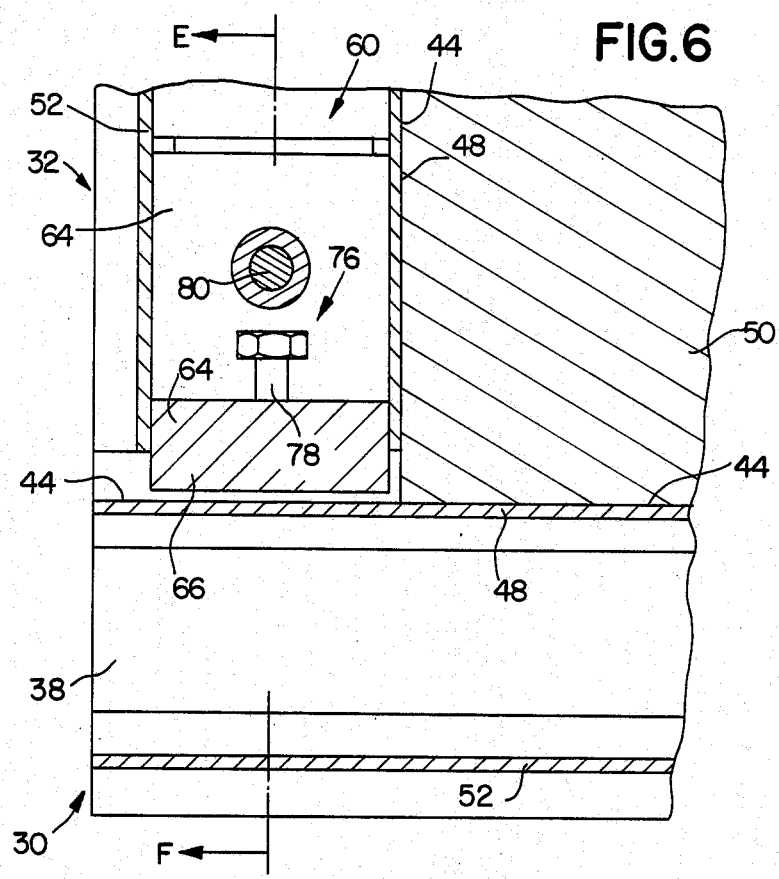
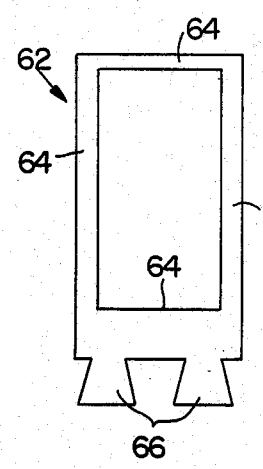
FIG.8
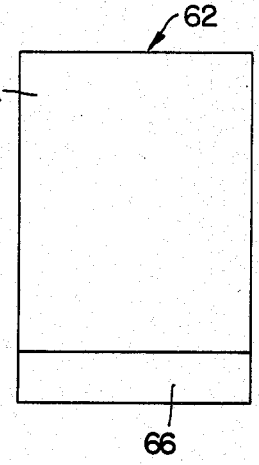
FIG.9
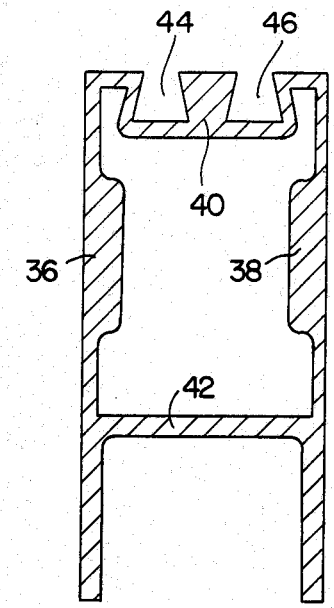
FIG.10

PANEL-LIKE STRUCTURAL COMPONENT

BACKGROUND OF THE INVENTION

The invention relates to a panel-like structural component.

Such a panel-like structural component is used, for example, as a door leaf, a segment of a bellow-framed door consisting of several articulated segments, as a wall facing or cladding, as a partition or the like, although this list does not cover all possible uses. The preferred use for the panel-like structural component, however, is in the production of gates and doors, which is why this application is dealt with in particular in the following.

A panel-like structural component with the following features is known. The sectional members of the frame usually have an L-shaped or angular cross section. For a conventional rectangular frame, four such sectional members are joined at their corners by welding or by screws. The panel comprising the main wall, usually a sheet metal component, is inserted into the frame and welded or screwed to it or fastened to it using additional fasteners in the form of retainer strips or the like.

When such a panel-like structural component is used for a segment, e.g., of a bellow-framed door, the structural component must be required to have light weight so that the necessary opening times and forces will be as small as possible. It may occur during operation that the structural component is damaged by a material handling vehicle striking it. As a rule, repairing the bellow-framed door requires replacing the damaged segment with a new one, and usually, for reasons of time and cost, it is not feasible to repair the damaged segment itself. In this context, the structural components making up the segments must be economical to manufacture and repairable. The aforementioned requirements for low weight, low manufacturing costs and repairability are not fully satisfied by conventional structural components.

SUMMARY OF THE INVENTION

The object of the invention is to provide a structural component of the above-described type in such a way that it is light in weight, has low manufacturing costs and can be repaired in a relatively simple manner.

In the panel-like structural component of the invention, two sectional members of the frame are joined together by inserting the projection of the connecting piece into the groove in the associated sectional member. In the invention, a joint that is resistant to tension and compression is formed between the two sectional members in the longitudinal direction of that sectional member to which the connecting piece is fastened. This kind of connection is both easy to produce, keeping the manufacturing costs of the structural component low, and relatively simple to release, thereby facilitating repair work. At least one panel of the main wall is held in the grooves of the section members by the frame made up of the section members. The edges of the panel need only be inserted loosely in the grooves. Retainer strips for fastening the panel are not needed, so welding or the like is dispensed with. This not only keeps the assembly cost low but also permits the use of any panel materials, including plastics. Thus, it is possible to choose the best possible panel material in terms of price and weight, and other features such as transparency of the panel material can be required and obtained, because the type and way in which the frame of the structural component of the invention carries the main wall require no special panel characteristics.

The fact that, in the structural component of the invention, the same grooves that receive the main wall panels are used to produce the connection between two sectional members by engagement with the projections of the connecting pieces leads to relatively simple sectional members and does not require much machining to form the connections between the sectional members. For example, the beveling cuts on the abutting ends of the sectional members are eliminated.

Based on the design of the invention, the material and labor requirement in the manufacture of the structural component is relatively low, and a rigid but relatively lightweight product is obtained. The way in which the connections are made between two sectional members and in which the main wall panels are held permit relatively simple disassembly of the structural component, so in the event it is damaged, it can be repaired cheaply by replacing parts of the structural component.

Preferably, all sectional members of the frame and, optionally, additional inner members have the same rectangular cross section, and both the inner wall of each sectional member and the outer wall lying opposite it are provided with two parallel grooves. In a further advantageous embodiment of the invention, the connecting pieces consist of longitudinal segments of a sectional member with a hollow rectangular cross section, on one outer side of which the projections are formed in the manner of two strips with the same cross section as the grooves. In this embodiment, only two different sections are needed, i.e., a section for the sectional members of the frame and for the reinforcement members and another section for the connection pieces, which are cut to the desired length of the latter-named section. Since the frame has two grooves in the outer walls of its sectional members as well, additional components, such as sealing strips or the like can be fastened in a simple manner to these outer walls.

BRIEF DESCRIPTION OF THE DRAWINGS

Additional advantages of the invention can be inferred from the claims and the following description of a preferred embodiment with reference to the drawings, in which:

FIG. 3 is an enlarged cross section along line A-B in FIG. 2;

FIG. 4 is a cross section of a sectional member of the structural component according to FIG. 2;

FIG. 5 is a horizontal section along line C-D in FIG. 2, showing additional portions of a carrying frame;

FIG. 6 is an enlarged representation of detail X according to FIG. 2, partially in the cross-sectional view along line G-H in FIG. 7 to illustrate the connection between two abutting ends of sectional members of a frame of the structural component according to FIG. 2;

FIG. 7 is a cross section along line E-F in FIG. 6;

FIG. 8 is a perspective view of a longitudinal segment such as that used to form connecting pieces;

FIG. 9 is a side view of the longitudinal segment according to FIG. 8;

FIG. 10 is a cross section of a variant of the structural member according to FIG. 4; and FIG. 11 is a section of a rubber safety strip that can be fastened to the structural component.

DETAILED DESCRIPTION OF THE INVENTION

Figure 1:
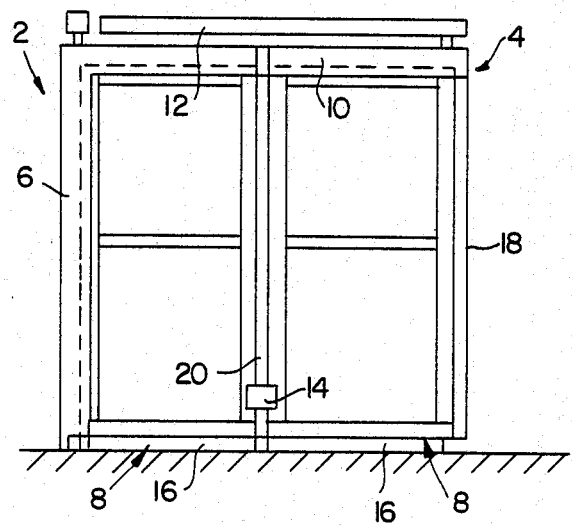
FIG. 1 is a simplified view of a bellow-framed door in which panel-like structural components are used for the segments.

FIG. 1 is a perspective view of a single-wing bellow-frame door including two articulated segments 2 and 4. The wing shown in FIG. 1, however, could also be one of two wings of a two-wing bellow-frame door. The left segment 2 in FIG. 1 includes a rigid L-shaped support frame 6, which is mounted to pivot at the top and bottom in pivot bearings. Inserted in frame 6, supported by frame 6, and rigidly fastened to frame 6 is a panel-like structural component 8, which is described in greater detail in the following. The right segment 4 in FIG. 1 includes a supporting arm 10, which is articulated at its left end, as shown in FIG. 1, with the frame 6 and supported by said frame, and is suspended from a track 12 at its right end in FIG. 1 by means of a carriage. Suspended from the supporting arm 10 is a panel-like structural component 8, which has the same design as the panel-like structural component 8 of the first segment 2. The two panel-like structural components 8 of the two segments 2 and 4 are joined together solely by an articulation 14 (not described in detail) near the lower end of the structural components 8. The two structural components 8 have a brush 16 at their lower edges to form a floor seal. Structural component 8 of the second segment 4 has a rubber safety strip 18 on its right edge in FIG. 1, and structural component 8 of the left segment 2 has a rubber sealing strip 20 on its right edge.

The bellow-frame door shown in FIG. 1 is opened from the position shown here by pivoting the frame 6 in its pivot bearing. When this is done, the first segment 2 carries with it the second segment 4, and the latter's carriage (not shown) runs leftward in FIG. 1 in the track 12. To enable this opening motion and the corresponding closing motion to occur rapidly, the panel-like structural components 8 held by the supporting components consisting of the frame 6 and the supporting arm 10, should have the lowest possible weight, as is the case of the structural components with the design described in the following. Advantageous here is the fact that the panel-like structural components 8 are rigid parts, so the bellow-framed door shown in FIG. 1 actually prevents passage in the closed state, in contrast to bellow-framed doors in which the panel-like structural components 8 are replaced by elastic panels which can be moved apart by hand even when the door is closed.

Figure 2:
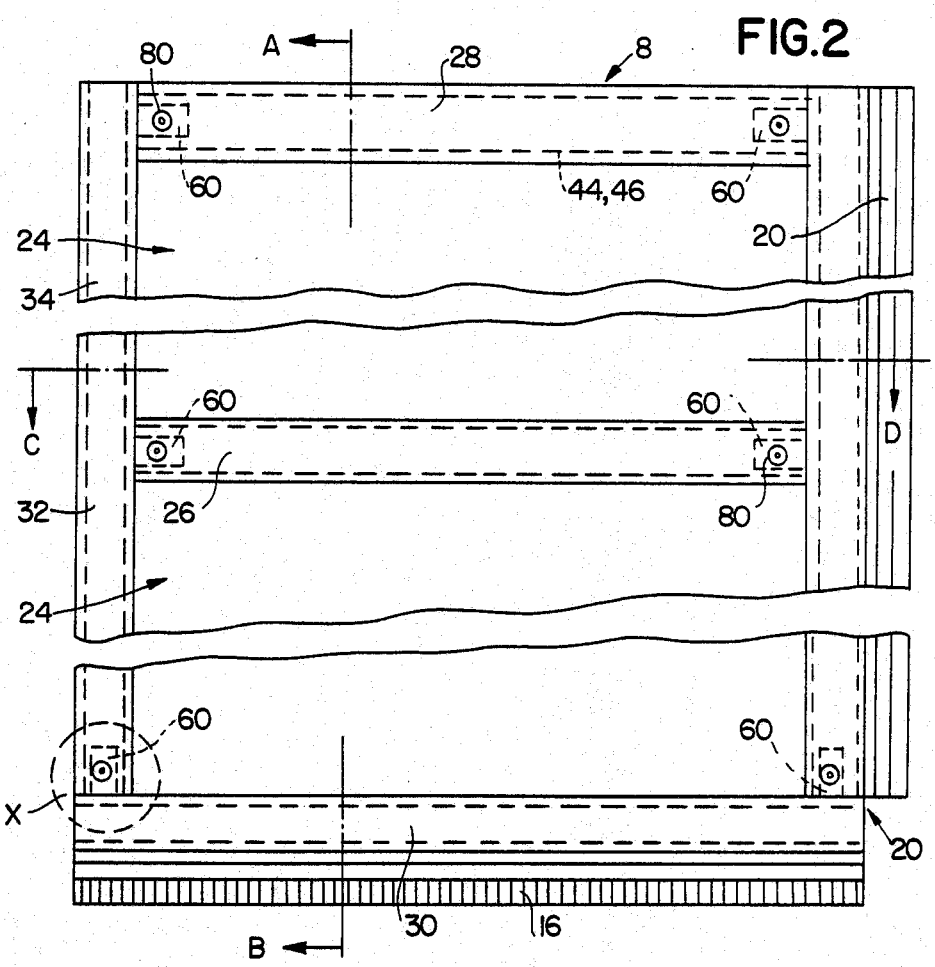
FIG. 2 is a view of a panel-like structural components such as that used in the bellow-frame door shown in FIG. 1.

As seen in FIG. 2, the panel-like structural component 8 consists of a frame 22, a main wall 24 and an inner member 26. As illustrated in particular by FIGS. 3 and 5, the frame 22 is made up of sectional members with the same cross sections, i.e., an upper sectional member 28, a lower sectional member 30, a left sectional member 32 and a right sectional member 34 (the terms "upper," "lower," "left" and "right" refer to FIG. 2). These four sectional members form a rectangle at the corners of which two sectional members abut at their ends. The lower sectional member 30 extends throughout the entire width of the frame 22, so the lower ends of the two lateral sectional members 32 and 34 are set from above onto the right and left end, respectively, of the lower sectional member 30, as shown in FIG. 2. The upper sectional member 28 is inserted between the upper ends of the two lateral sectional members 32 and 34, as also shown in FIG. 2. In each case, the end face of a sectional member abuts against a wall of the other respective sectional member.

The inner member 26 runs parallel to the upper and lower sectional member 28 and 30, respectively, at approximately halfway up the height of the structural component 8 and is the same length as the upper sectional member 28, so it is also arranged between the two lateral sectional members 32 and 30 with which it is in contact and is connected. The inner member 26 reinforces the frame 6 and divides the interior of the frame into two compartments, so the main wall panels in the two compartments can be designed differently, for example, consisting of different materials. It is self-evident that two or more inner members 26 may also be provided, so a correspondingly large number of areas is created. However, the exemplified embodiment illustrated here with only one inner member 26 is the basis of the following description.

The sectional members 28, 30, 32 and 34 and inner member 26 all have the cross sections shown in FIG. 4, which is a hollow rectangular cross section with the four walls of the sectional member and inner member corresponding to the four sides of the rectangle. As shown in FIG. 4, these walls are: a left wall 36 with a smooth outer surface, a right wall 38 with a smooth outer surface, an upper wall 40 and a lower wall 42. Both the left wall 36 and the right wall 38 are provided in their center with a thickened portion throughout the length of the sectional member and inner member so that sufficient material will be present there for threaded holes or the like. The upper wall 40 is provided with two parallel grooves 44 and 46 extending throughout the length of the members which are open to the exterior and have a dovetailed recess, expanding toward the interior of the groove. The lower wall 42 has the same form, so the entire section is radially symmetrical from the center of the cross section, as shown in FIG. 4. A member with the above-described cross section can be produced, for example, by extrusion.

The sectional members 28, 30, 32 and 34 are then joined to the frame 22 in such a way that a wall 40 or 42 with grooves 44 and 46 faces the inside of the frame and forms an inner wall 48 of the sectional member in the frame. The inner member 26 is fitted between the two sectional members 32 and 34 in such a way that its walls 40 and 42, provided with grooves 44 and 46, face the frame (and are not open to the front side or back side of the structural component). By virtue of this design and configuration, the grooves 44 and 46 in the inner walls 48 and the walls 40 and 42 of the reinforcing member open into each other, so two interconnected grooves are formed in the frame 22, both above the reinforcing member 26 and below it, and their segments form grooves 44 and 46. Inserted in each of these interconnected grooves is an essentially flat panel 50, consisting for example of a light, sufficiently strong, possibly transparent plastic. As we see from the above description, each panel 50 is secured adequately by the grooves and prevented from pulling out of the frame 22, so additional fastening is not needed.

In the above-described exemplified embodiment, the four panels 50 form the main wall 24 of the structural component 8. Two panels 50 each are arranged parallel to each other to form a small intermediate space, providing favorable thermal and acoustic insulation characteristics. It is self-evident that the main wall 24 can also have a different design. For example, it is possible to provide only one panel 50 in the upper and lower region of the structural component 8. It is also possible, if parallel panels form an intermediate space, to fill this intermediate space with additional material for insulation purposes. Finally, the two parallel panels 50 need not have the same design. For example, a stronger and thicker panel 50 could be provided on the outer side of the structural component 8 than on the inner side of the structural component.

In any case, the above-described design of the structural component is found to permit numerous alternative designs with regard to the main wall 24; the amount of material used can be reduced, and the assembly, that is, the insertion into the interconnected grooves, does not require much labor.

Since the sectional members, which are symmetrical relative to the center of the sections, are arranged in such a way that their inner walls 48 are walls with grooves 44 and 46, the outer walls 52 lying opposite the inner walls 48 are provided with grooves 44 and 46, so the frame 22 is provided with grooves 44 and 46 along its entire outer edge. This makes is possible to add additional parts in a simple manner to the outer edge of the structural component 8. For example, the brush 16 is mounted on the outer wall 52 of the lower sectional member 30 using a brush holder 54, which has two projections inserted in grooves 44 and 46 of outer wall 52, as shown in FIG. 3. FIGS. 2–7 show the structural component 8, which is part of the first segment 2. This structural component 8 has, on its right edge, the rubber sealing strip 20, which is shown in a cross-sectional view in FIG. 5. Molded integrally with the sealing strip 20 are two projections in the form of strips 56, which extend over the entire length of sealing strip 20 and are inserted in grooves 44 and 46 of the right sectional member 34 outer wall 52. In structural component 8, which is part of the second segment 4, the sealing strip 20 is replaced by a rubber safety strip 18, as shown in FIG. 11, said strip having a chamber 58 filled with air or another gas, so that a blow against the rubber strip 18 increases the pressure of the gas, and this pressure increase can be evaluated as a signal for foreign-body contact with the bellow-frame door.

The parts briefly explained above, i.e., the brush holder 54, sealing strip 20 and rubber safety strip 18, are not necessarily installed on structural component 8. However, they show that the grooves in the sectional members can be used additionally and in a simple manner to add other parts to the structural component 8.

Grooves 44 and 46 in the sectional members perform an additional function in conjunction with the connection of two abutting ends of the sectional members or of one end of the inner member 26 with the adjacent sectional member. These joints all have the same design, so the following detailed description of the joint between the lower end of the left sectional member 32 and the left end of the lower sectional member 30 applies analogously to all of the aforementioned joints. Sectional member 32 is cut off straight at its lower end; sectional member 30 is also cut off straight at its left end. At its lower end face, sectional member 32 is set on the inner wall 48 of sectional member 30, as shown in FIG. 6. As a result, grooves 44 form the continuous peripheral groove that receives panel 50, as also shown in a detail sketch in FIG. 6.

A connecting piece 60 is fastened to the lower end of sectional member 32. The connecting piece 60 is made up of a longitudinal segment 62 of a sectional member (not shown), which has a hollow rectangular cross section, as shown in particular in FIG. 8. The longitudinal segment 62 is obtained by cutting off a piece of suitable length from the connecting piece sectional member and thus has four essentially flat walls 64, arranged in parallel pairs. Molded integrally with the lower wall 64 of the longitudinal segment 62 in FIG. 8 are two projections 66, which are designed as strips extending in the longitudinal direction of the connecting piece sectional member and have the same dovetail section as grooves 44 and 46 in the sectional members and the reinforcing member. The outer dimensions of the longitudinal segment 62 and hence of the connecting piece 60 are chosen such that the connecting piece 60 fits snugly inside the sectional member 32 in such a way that two opposite walls 64 lie against inner sides 68 of the sectional member 32, as shown in FIG. 7.

After the above-described longitudinal segment 62 is provided as stated above with a threaded hole 70, two aligned apertures 72 and an aperture 74 to produce connecting piece 60, the connecting piece 60 can be engaged with the end of the sectional member 30 by slipping the two projections 66 into grooves 44 and 46 so that the connecting piece 60 assumes the position illustrated in FIGS. 6 and 7, relative to sectional member 30. In the desired position, connecting piece 60 is then locked in place using a tightening device 76, which in the exemplified embodiment illustrated here, includes a bolt 78 which is screwed into the threaded hole 70 and abuts against the inner wall 48 at the end of its shank. It is evident that by tightening the bolt 78, projections 66 are drawn at their edges against the adjacent edges of grooves 44 and 46, producing tension.

The lower end of the sectional member 32, which is fastened to the connecting piece 60 using a bolted joint 80, is set on the locked connecting piece 60.

In the manner described above, a rigid, solid joint is achieved between the two abutting ends of two sectional members. For this purpose, efficient use is made of the grooves 44 and 46, which are present in any case in the sectional members. The necessary connecting piece 60 is cut in a suitable length from a suitable sectional member. Thus, the entire frame 22, including the reinforcing member 26 and the connecting pieces 60, can be made of sectional members with only two different cross sections (and standard parts such as screws and the like). The joints can be released in a simple manner, so the structural component can be disassembled in the event it is damaged, and the damaged parts can be replaced.

The above-described structural component 8 is assembled by fitting the sectional members and any inner members together in such a way that open compartments are formed on one side, and the panels are inserted into these compartments from the open side, after which the compartments are closed on the side that was open theretofore. In the exemplified embodiment of structural component 8 illustrated and explained above, the two upper connecting pieces 60 are, for example, first fastened at the desired areas on the sectional member 32, and the upper two connecting pieces 60 are also fastened on the desired areas of sectional member 34. Then the upper sectional member 28 and inner member 26 are joined with the connecting pieces 60 to sectional member 32, inner member 26 and sectional member 28 then form an open compartment on one side, i.e., the right side in FIG. 2, into which compartment the two upper panels 50 are inserted, and the edges of the panels are received and guided by grooves 44 and 46 in the inner member 26 and the sectional member 28. When the panels 50 are inserted, the connecting pieces 60 attached to the sectional member 34 are inserted in the open right ends of inner member 26 and sectional member 28 and joined with the latter-named members. Thus, the compartment into which the two panels 50 had been inserted is closed, and the two panels are secured and held without requiring safety strips or the like. At this point of the assembly, the two sectional members 32 and 34 and inner member 26 form an additional compartment which is open at the bottom and into which the respective panels 50 are inserted from below (in FIG. 2), as explained above. After the last two panels are inserted, sectional member 30 is then fastened to the remaining portion of the frame and the lower compartment of structural component 8 is closed.

It is evident that the sectional members forming the frame need not abut against each other precisely as shown in FIG. 2. At variance with the examples given here, sectional member 30, for example, could abut at its end faces against the inner walls of sectional members 32 and 34. The manner in which adjacent ends of the sectional members abut each other depends upon the application in question, allowing for the requirement that proper assembly of the structural component must be possible.

The type and manner of the joint or fastening of the structural component, described in detail above, to other parts or devices depends upon the application. For the application in the bellow-frame door according to FIG. 1, it is only indicated obliquely in FIG. 5 that structural component 8 is inserted with its left sectional member 32 into frame 6 and bolted to it with bolts 82.

It is evident that numerous modifications of the above-described exemplified embodiment are possible within the scope of the invention. For example, the two walls 40 and 42 of the sectional members need not have the same design. In fact, that wall 42 which forms no inner wall in frame 22 can be designed without grooves 44 and 46, as shown in FIG. 10 as a modification of FIG. 4, if the advantages of the grooves in the outer edge of the frame are not needed.

A panel-like structural component for gates, doors, facings or the like includes a main wall and a frame surrounding the main wall. The frame is composed of sectional members with hollow rectangular cross sections whose inner walls facing the inside of the frame have at least one groove running in the longitudinal direction of the member. The grooves of all sectional members open into each other and form a continuous peripheral groove into which a panel is inserted at its edges to form the main wall. The grooves are also used for joining two sectional members: the groove, which widens toward its interior, is locked and engaged at one of the sectional members with a projection formed on a connecting piece attached to the other sectional member. The connecting piece consists of a segment of another sectional member. The structural component can be produced with little labor and material; it is stable and lightweight, and can be disassembled to simplify repair in the event it is damaged.

Various modifications in structure and/or function may be made to the disclosed embodiments by one skilled in the art without departing from the scope of the invention as defined by the claims.

What is claimed is:

1. Panel-like structural component comprising:
a main wall having at least one essentially flat panel,
a rectangular frame having a plurality of straight sectional members having a hollow rectangular cross-section, each of the sectional members having an inner wall which faces inside of the frame and in which two parallel grooves are formed which extend in the longitudinal direction of the sectional member and widen toward the interior of the groove,
two sectional members each being interconnected at a right angle by means of a connecting piece, the connecting piece comprising a longitudinal segment of a sectional member with a hollow rectangular cross-section, the connecting piece being inserted in the interior of a first one of the two interconnected sectional members at one of its ends wherein the connecting piece lies with at least two opposite wall flush against inner surfaces of the first sectional member,
the first sectional member being fastened to the connecting piece by means of connection means,
two projecting strips being formed on a third wall of the connecting piece to form two projections each of which is engaged with one of the two grooves of the second one of the two sectional members and is positively engaged with the sides of the groove, and
a tightening means engaging into the connecting piece or into the associated inner wall of the second sectional member for bracing the inner wall and the connecting piece against each other.

2. Structural component according to claim 1 wherein all of the sectional members forming the frame have inner walls of identical design.

3. Structural component according to claim 1 or 2, wherein the sectional members have an outer wall lying on an outer side of the frame which is symmetrical to the inner wall in relation to the cross-section.

4. Structural component according to claim 3, wherein the cross-section is radially or centrally symmetric.

5. Structural component according to claim 1 or 2 wherein the frame is reinforced by at least one inner member which passes through the interior of the frame, the inner member having a hollow rectangular cross section and the inner member walls having at least one groove substantially similar to the groove of the inner walls of the sectional members of the frame.

6. Structural component according to claim 5, wherein the inner member has the same cross section as the sectional members.

7. Structural component according to claim 5 wherein the inner member is joined at each of its ends to an adjacent sectional member in the same way as two sectional members are joined together at their ends.

8. Structural component according to claim 1 or 2 wherein at least one groove has a dovetailed cross section.

9. Structural component according to claim 1 or 2 wherein at least one groove has a hammerhead cross section.

10. Structural component according to claim 1 or 2 wherein the main wall has essentially flat panels, one of which has its edges situated in one of the two grooves and the other has its edges in the other of the two grooves.

11. Structural component according to claim 1 or 2 wherein the projection has the same cross section as the groove into which it extends.

12. Structural component according to claim 1 wherein the tightening means is a screwed bolt.

* * * * *